US008389288B2

(12) United States Patent
Heimberg et al.

(10) Patent No.: US 8,389,288 B2
(45) Date of Patent: Mar. 5, 2013

(54) DEVICE FOR THE CARRYING OUT OF CHEMICAL OR BIOLOGICAL REACTIONS

(75) Inventors: Wolfgang Heimberg, Ebersberg (DE); Thomas Herrmann, Ottobrunn (DE); Matthias Knulle, Grafing (DE); Markus Schurf, Siegsdorf (DE); Tilmann Wagner, Grafing (DE)

(73) Assignee: Applied Biosystems, LLC, Carlsbad, CA (US)

( * ) Notice: Subject to any disclaimer, the term of this patent is extended or adjusted under 35 U.S.C. 154(b) by 117 days.

(21) Appl. No.: 12/689,212

(22) Filed: Jan. 18, 2010

(65) Prior Publication Data

US 2010/0120099 A1 May 13, 2010

Related U.S. Application Data

(63) Continuation of application No. 10/089,136, filed on Dec. 23, 2002, now abandoned.

(30) Foreign Application Priority Data

Oct. 1, 1999 (DE) .............................. 299 17 313 U
Sep. 29, 2000 (WO) ....................... PCT/EP00/09569

(51) Int. Cl.
*G01N 25/32* (2006.01)

(52) U.S. Cl. .................................... 436/147; 422/82.12

(58) Field of Classification Search .................... 436/50, 436/55; 422/109, 108, 105, 102
See application file for complete search history.

(56) References Cited

U.S. PATENT DOCUMENTS 3,036,893 A 5/1962 Natelson
3,128,239 A 4/1964 Page
3,216,804 A 11/1965 Natelson
3,260,413 A 7/1966 Natelson
3,261,668 A 7/1966 Natelson
3,271,112 A 9/1966 Williams et al.
3,331,665 A 7/1967 Natelson
3,368,872 A 2/1968 Natelson
3,556,731 A 1/1971 Martin
4,865,986 A 9/1989 Coy et al.
4,950,608 A 8/1990 Kishimoto
(Continued)

FOREIGN PATENT DOCUMENTS

EP 0089383 9/1983
EP 0488769 A2 6/1992
(Continued)

OTHER PUBLICATIONS

"LightCycler® 480 System Rapid by Nature—Accurate by Design", *brochure, Roche Diagnostics*, printed from www.roche-applied-science.com,, 16.

*Primary Examiner* — Natalia Levkovich

(57) ABSTRACT

The invention relates to a device for the carrying out of chemical or biological reactions with a reaction vessel receiving element for receiving a microtiter plate with several reaction vessels, wherein the reaction vessel receiving element has several recesses arranged in a regular pattern to receive the respective reaction vessels, a heating device for heating the reaction vessel receiving element, and a cooling device for cooling the reaction vessel receiving element.

Figure 1:
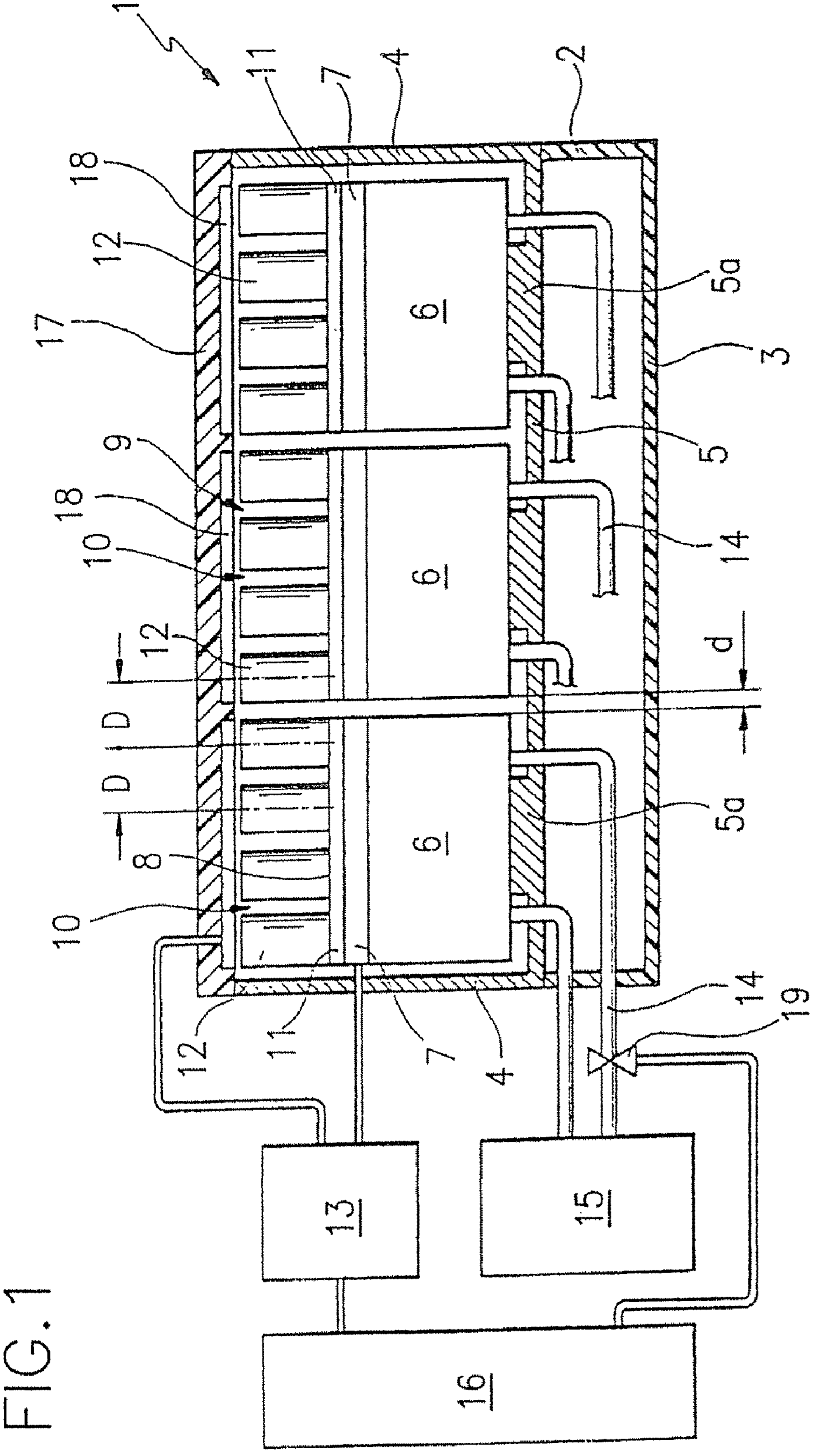

The invention is characterized by the fact that the reaction vessel receiving element is divided into several segments. The individual segments are thermally decoupled from one another, and each segment is assigned a heating device which may be actuated independently of the others.

By means of the segmentation of the reaction vessel receiving element, it is possible for zones to be set and held at different temperatures. Since the reaction vessel receiving element is suitable for receiving standard microtiter plates, the device according to the invention may be integrated in existing process sequences.

8 Claims, 7 Drawing Sheets

U.S. PATENT DOCUMENTS

| | | | | |
|---|---|---|---|---|
| 5,038,852 | A | 8/1991 | Johnson et al. | |
| 5,061,630 | A | 10/1991 | Knopf et al. | |
| 5,224,536 | A | 7/1993 | Eigen et al. | |
| 5,333,675 | A | 8/1994 | Mullis et al. | |
| 5,430,957 | A | 7/1995 | Eigen et al. | |
| 5,441,576 | A | 8/1995 | Bierschenk et al. | |
| 5,475,610 | A | 12/1995 | Atwood et al. | |
| 5,525,300 | A | 6/1996 | Danssaert et al. | |
| 5,601,141 | A * | 2/1997 | Gordon et al. | 165/263 |
| 5,656,493 | A | 8/1997 | Mullis et al. | |
| 5,716,842 | A | 2/1998 | Baier et al. | |
| 5,819,842 | A * | 10/1998 | Potter et al. | 165/206 |
| 5,871,908 | A | 2/1999 | Henco et al. | |
| 6,093,370 | A | 7/2000 | Yasuda et al. | |
| 6,525,550 | B2 | 2/2003 | Pan | |
| 6,558,947 | B1 | 5/2003 | Lund et al. | |
| 6,633,785 | B1 | 10/2003 | Kasahara et al. | |
| 6,767,512 | B1 | 7/2004 | Lurz et al. | |
| 6,814,934 | B1 | 11/2004 | Higuchi et al. | |
| 6,825,047 | B1 | 11/2004 | Woudenberg et al. | |
| 2001/0001644 | A1 | 5/2001 | Coffman et al. | |
| 2004/0241048 | A1 | 12/2004 | Shin et al. | |
| 2006/0024816 | A1 | 2/2006 | Fawcett et al. | |
| 2006/0228268 | A1 | 10/2006 | Heimberg et al. | |

FOREIGN PATENT DOCUMENTS

| | | | |
|---|---|---|---|
| EP | 0545736 | | 6/1993 |
| EP | 0776967 | A2 | 6/1997 |
| EP | 0812621 | A1 | 12/1997 |
| WO | 89/12502 | | 12/1989 |
| WO | 90/05947 | | 5/1990 |
| WO | 92/04979 | | 4/1992 |
| WO | 95/11294 | | 4/1995 |
| WO | 98/20975 | | 5/1998 |
| WO | 01/24930 | A1 | 4/2001 |

* cited by examiner

DEVICE FOR THE CARRYING OUT OF CHEMICAL OR BIOLOGICAL REACTIONS

The present invention relates to a device for the carrying out of chemical or biological reactions with a reaction vessel receiving element for receiving reaction vessels, wherein the reaction vessel receiving element has several recesses arranged in a regular pattern to receive reaction vessels, a heating device for heating the reaction vessel receiving element, and a cooling device for cooling the reaction vessel receiving element.

Such devices are described as thermocyclers or thermocycling devices and are used to generate specific temperature cycles, i.e. to set predetermined temperatures in the reaction vessels and to maintain predetermined intervals of time.

A device of this kind is known from U.S. Pat. No. 5,525,300. This device has four reaction vessel receiving elements, each with recesses arranged in a regular pattern. The pattern of the recesses corresponds to a known pattern of reaction vessels of standard microtiter plates, so that microtiter plates with their reaction vessels may be inserted in the recesses.

The heating and cooling devices of a reaction vessel receiving element are so designed that a temperature gradient extending over the reaction vessel receiving element may be generated. This means that, during a temperature cycle, different temperatures may be obtained in the individual reaction vessels. This makes it possible to carry out certain experiments at different temperatures simultaneously.

This temperature gradient is used to determine the optimal denaturing temperature, the optimal annealing temperature and the optimal elongation temperature of a PCR reaction. To achieve this, the same reaction mixture is poured into the individual reaction vessels, and the temperature cycles necessary to perform the PCR reaction are executed. Such a temperature cycle comprises the heating of the reaction mixture to the denaturing temperature, which usually lies in the range 90°-95° C., cooling to the annealing temperature, which is usually in the range 40°-60° C., and heating to the elongation temperature, which is usually in the range 70-75° C. A cycle of this kind is repeated several times, leading to amplification of a predetermined DNA sequence.

Since a temperature gradient can be set, different but predetermined temperatures are set in the individual reaction vessels. After completion of the cycles it is possible to determine, with the aid of the reaction products, those temperatures at which the PCR reaction will give the user the optimal result. Here the result may be optimised e.g. in respect of product volume or also product quality.

The annealing temperature, at which the primer is added, has a powerful influence on the result. However the elongation temperature too can have beneficial or adverse effects on the result. At a higher elongation temperature, the addition of the bases is accelerated, with the probability of errors increasing with higher temperature. In addition, the life of the polymerase is shorter at a higher elongation temperature.

A thermocycling device, by which the temperature gradient may be set, makes it much easier to determine the desired temperatures, since a reaction mixture my simultaneously undergo cycles at different temperatures in a single thermocycling device.

Another important parameter for the success of a PCR reaction is the residence time at the individual temperatures for denaturing, annealing and elongation, and the rate of temperature change. With the known device, these parameters can not be varied in one test series for an individual reaction vessel holder. If it is desired to test different residence times and rates of change, this can be done in several test series either consecutively on one thermocycling device or simultaneously in several thermocycling devices.

For this purpose there are so-called multiblock thermocycling devices with several reaction vessel receiving elements, each provided with separate cooling, heating and control devices (see U.S. Pat. No. 5,525,300). The reaction mixture to be tested must be distributed over several microtiter plates, for testing independently of one another.

To determine the optimal residence times and rates of temperature change it is necessary to have either several thermocycling devices or a multiblock thermocycling device, or to carry out tests in several consecutive test series. The acquisition of several thermocycling devices or of a multiblock thermocycling device is costly and the carrying-out of several consecutive test series takes too long. In addition, handling is laborious when only part of the reaction vessels of several microtiter plates is filled, with each of the latter being tested and optimised in separate test series. This is especially disadvantageous in the case of device which operate automatically and in which the reaction mixtures are subject to further operations, since several microtiter plates must then be handled separately. It is also extremely impractical when only part of the reaction vessels of the microtiter plates is filled, since the devices for further processing, such as e.g. sample combs for transferring the reaction products to an electrophoresis apparatus, are often laid out on the grid of the microtiter plates, which means that further processing is correspondingly limited if only part of the reaction vessels of the microtiter plate is used.

U.S. Pat. No. 5,819,842 discloses a device for the individual, controlled heating of several samples. This device has several flat heating elements arranged in a grid pattern on a work surface. Formed below the heating elements is a cooling device which extends over all the heating elements. In operation a specially designed sample plate is placed on the work surface. This sample plate has a grid plate, covered on the underside by a film. The samples are poured into the recesses of the grid plate. In this device the samples lie on the individual heating elements, separated from them only by the film. By this means, direct heat transfer is obtained. The drawback of this device, however, is that no commonly available microtiter plate can be used.

With increasing automation in biotechnology, thermocyclers are increasingly being used in automated production lines and with robots as one of several work stations. Here it is customary for the samples to be passed in microtiter plates from one work station to the next. If the device according to U.S. Pat. No. 5,819,842 were to be used in such an automated production process, it would be necessary for the samples to be pipetted out of a microtiter plate into the specially designed sample plate before temperature adjustment, and from the sample plate into a microtiter plate after temperature adjustment. Here there is a risk of contamination of the samples. The use of this specially designed sample plate must therefore be regarded as extremely disadvantageous.

The invention is based on the problem of developing the device described above in such a way that the disadvantages described above are avoided and the parameters of the PCR process may be optimised with great flexibility.

To solve this problem the invention has the features specified in claim 1. Advantageous developments thereof are set out in the additional claims.

The invention is characterised by the fact that the reaction vessel receiving element is divided into several segments, with the individual segments thermally decoupled and each segment assigned a heating device which may be actuated independently.

By this means the individual segments of the device may be set to different temperatures independently of one another. This makes it possible not only to set different temperature levels in the segments, but also for them to be held for varying lengths of time or altered at different rates of change. The device according to the invention thus permits optimisation of all physical parameters critical for a PCR process, while the optimisation process may be carried out on a single reaction vessel receiving element in which a microtiter plate may be inserted.

With the device according to the invention it is therefore also possible to optimise the residence times and rates of temperature change without having to distribute the reaction mixture over different microtiter plates for this purpose.

The thermocycling device according to the invention is in particular suitable for optimising the multiplex PCR process, in which several different primers are used.

The above problem, and the features and advantages according to the present invention, may be better understood from the following detailed description of preferred embodiments of the present invention and with reference to the associated drawings.

Figure 2:
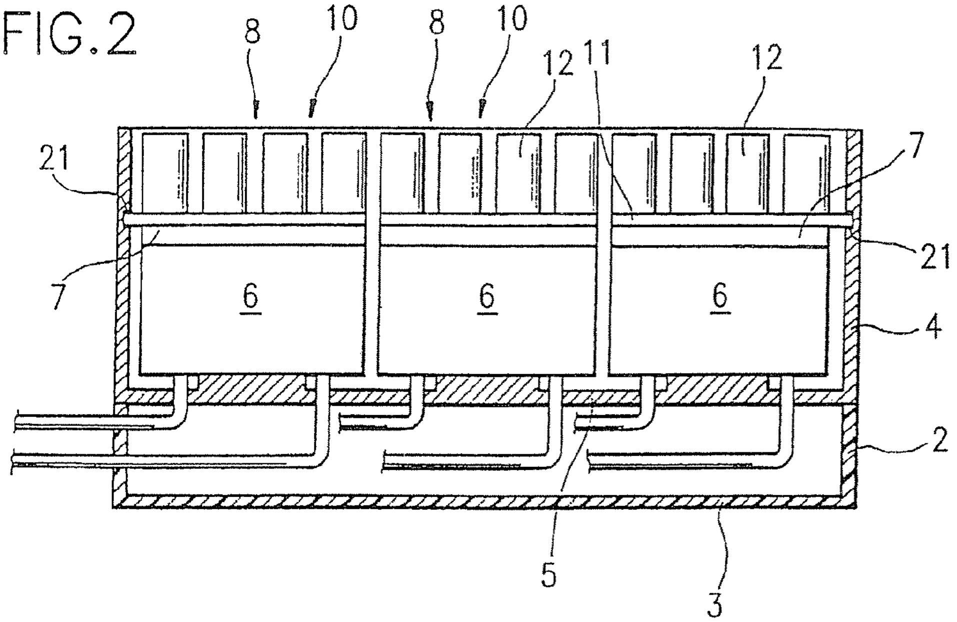
Figure 3:
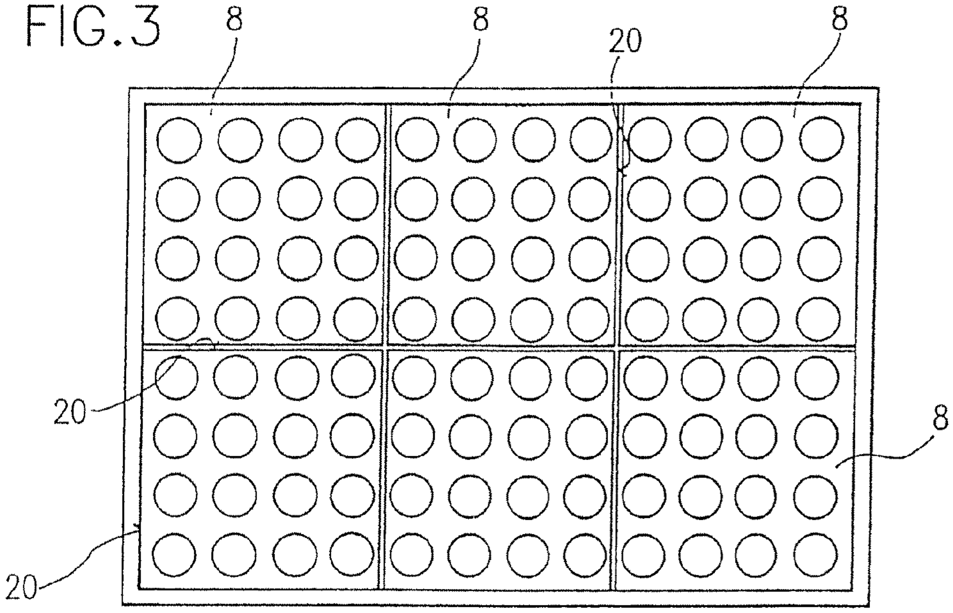
Figure 4:
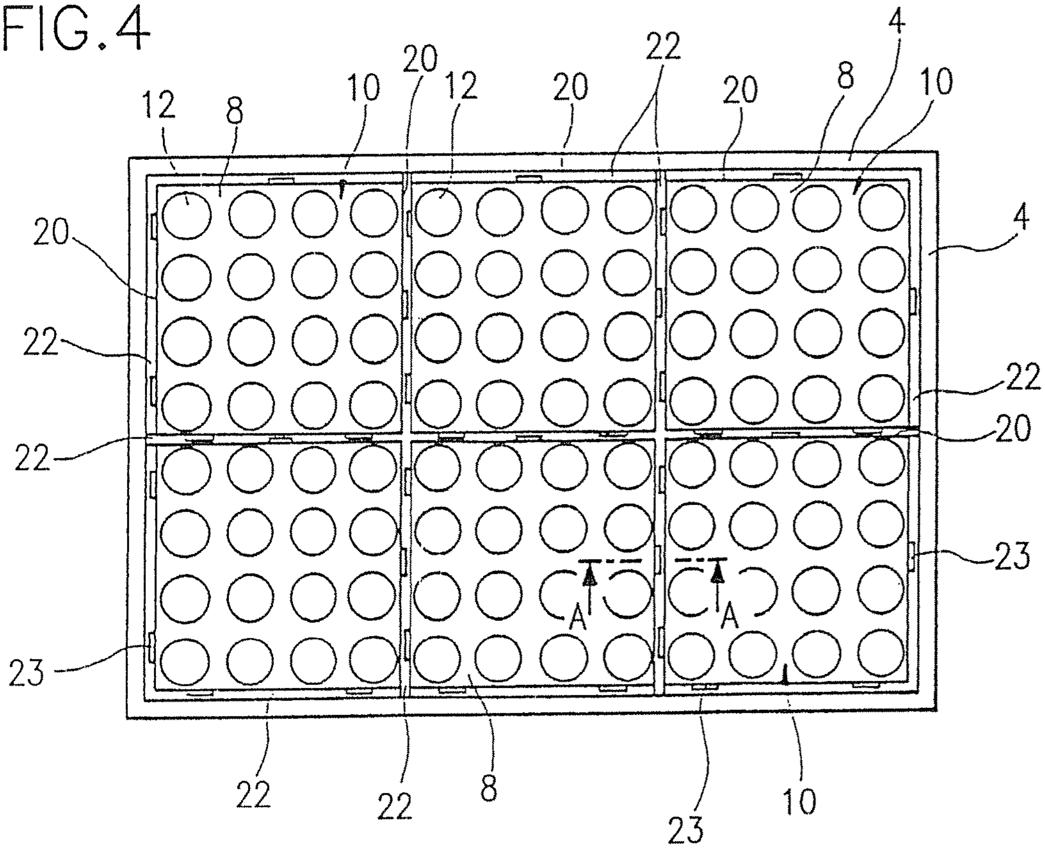
Figure 8:
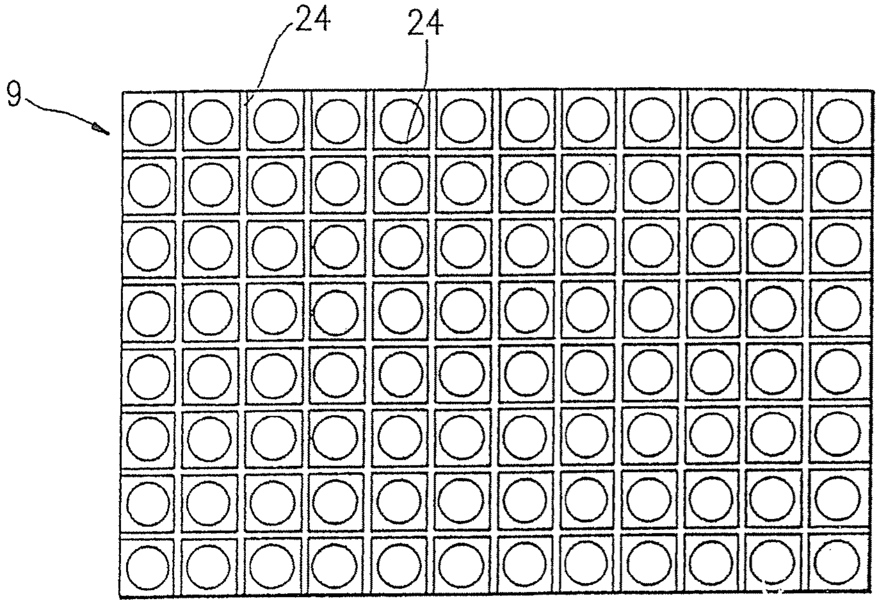
Figure 9:
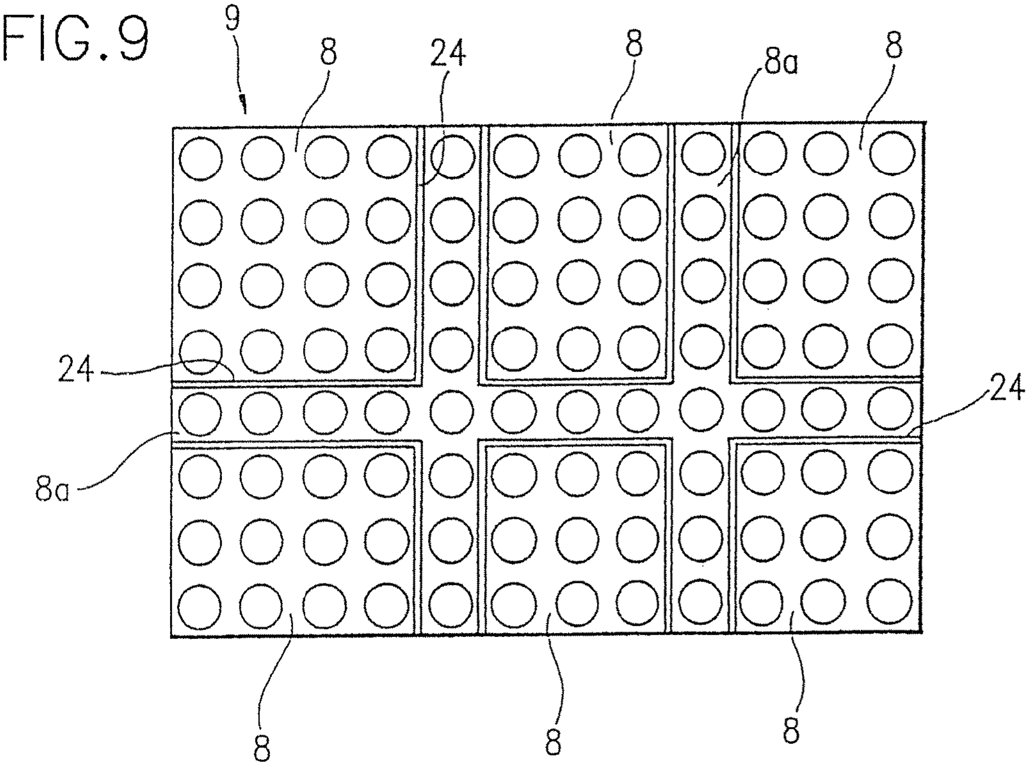
Figure 10:
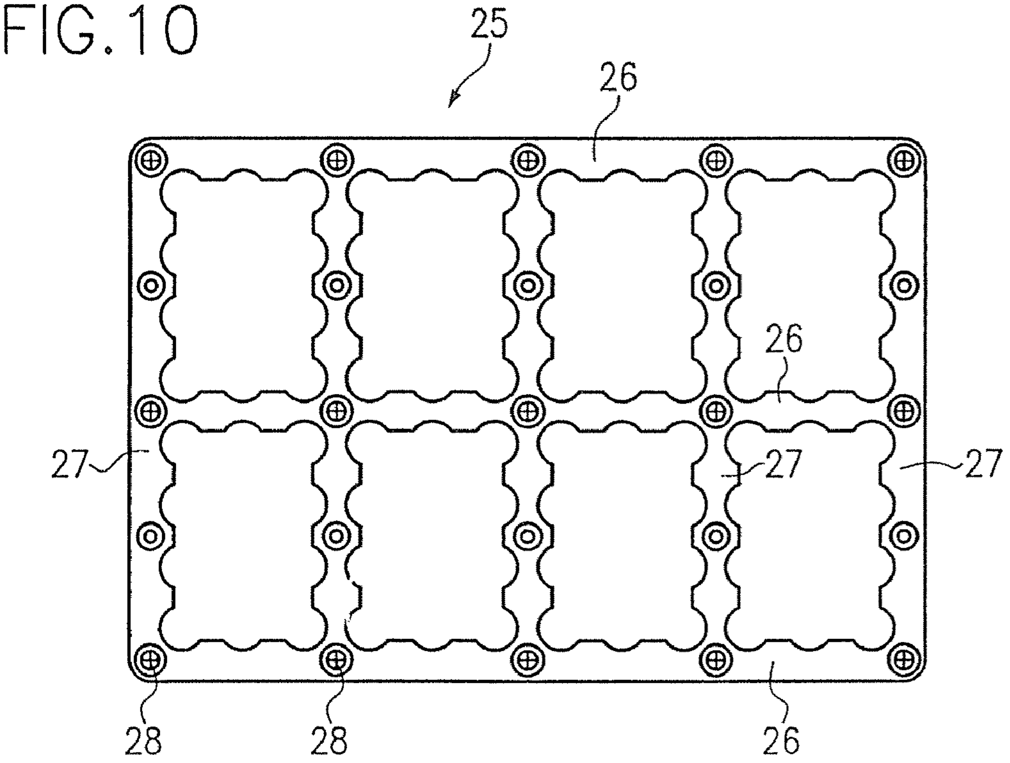
Figure 11:
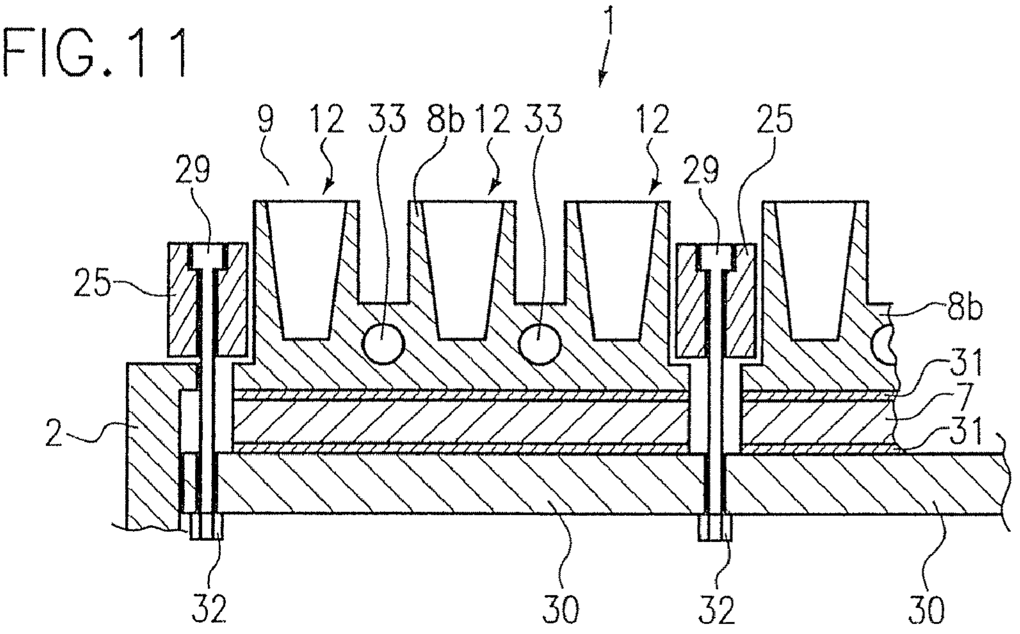
Figure 12:
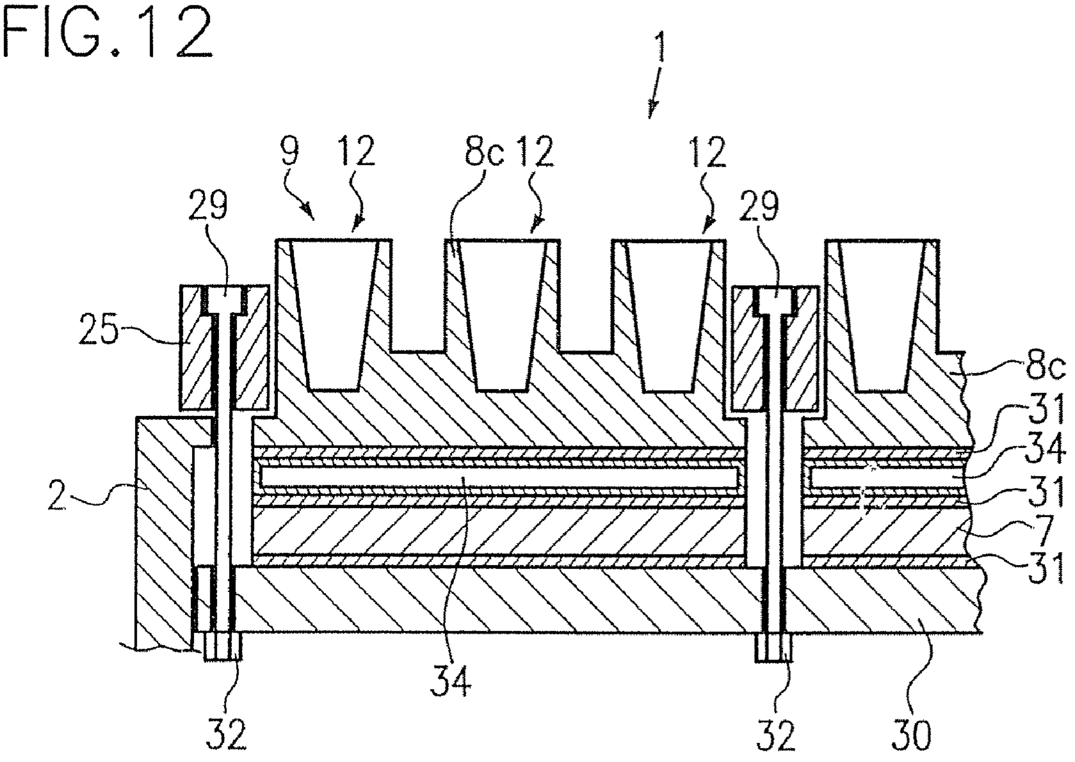

The invention is explained in detail below with the aid of the drawings. These show in:

FIG. 1 a section through a device according to the invention for carrying out chemical or biological reactions in accordance with a first embodiment, FIG. 2 a section through an area of a device according to the invention for carrying out chemical or biological reactions in accordance with a second embodiment, FIG. 3 a schematic plan view of the device of FIG. 2, FIG. 4 a schematic plan view of a device according to a third embodiment, an area of the device of FIG. 4 in a sectional view along the line A-A, FIGS. 6 to 9 schematic plan views of reaction vessel receiving elements with differing segmentation FIG. 10 a clamping frame in plan view FIG. 11 a device according to the invention in which segments of a reaction vessel receiving element are fixed by the clamping frame according to FIG. 10, and FIG. 12 a further embodiment of a device according to the invention in section, in which segments of a reaction vessel receiving element are fixed by the clamping frame according to FIG. 10.

FIG. 1 shows a first embodiment of the device 1 according to the invention for carrying out chemical or biological reactions in a schematic sectional view.

The device has a housing 2 with a bottom 3 and side walls 4. Located just above and parallel to the bottom 3 is an intermediate wall 5, on which are formed several bases 5*a*. In the embodiment shown in FIG. 1, a total of six bases 5*a* are provided, arranged in two rows of three bases 5*a* each.

Mounted on each of the bases 5*a* is a heat exchanger 6, a Peltier element 7 and a segment 8 of a reaction vessel receiving element 9. The heat exchanger 6 is part of a cooling device and the Peltier element 7 is part of a combined heating and cooling device. The elements (heat exchanger, Peltier element, segment) mounted on the bases 5*a* are bonded by an adhesive resin with good heat conducting properties, so that good heat transfer is realised between these elements, and the elements are also firmly connected to a segment element 10. the device has altogether six such segment elements 10. Instead of adhesive resin, a heat conducting film or a heat conducting paste may also be provided.

Each of the segments 8 of the reaction vessel receiving element 9 has a base plate 11 on which tubular, thin-walled reaction vessel holders 12 are integrally formed. In the embodiment depicted in FIG. 1, in each case 4×4 reaction vessel holders 12 are arranged on a base plate 11. The distance d between adjacent segments 8 is such that the reaction vessel holders 12 of all segments 8 are arranged in a regular pattern with constant grid spacing D. The grid spacing D is chosen so that s standardised microtiter plate with its reaction vessels may be inserted in the reaction vessel holders 12.

By providing the distance d between adjacent segments, an air gap which thermally decouples the segments 8 and segment elements 10 respectively is formed.

The reaction vessel holders 12 of the device shown in FIG. 1 form a grid with a total of 96 reaction vessel holders, arranged in eight rows each with twelve reaction vessel holders 12.

The Peltier elements 7 are each connected electrically to a first control unit 13. Each of the heat exchangers 6 is connected via a separate cooling circuit 14 to a second control unit 15. The cooling medium used is for example water, which is cooled in the cool temperature control unit before transfer to one of the heat exchangers 6.

The first control unit 13 and the second control unit 15 are connected to a central control unit 16 which controls the temperature cycles to be implemented in the device. Inserted in each cooling circuit 14 is a control valve 19, which is controlled by the central control unit 16 to open or close the respective cooling circuit 14.

Pivotably attached to the housing 2 is a cover 17 in which additional heating elements 18 in the form of Peltier elements, heating films or semiconductor heating elements may be located. The heating elements 18 form cover heating elements, each assigned to a segment 8 and separately connected to the first control unit 13, so that each heating element 18 may be individually actuated.

The mode of operation of the device according to the invention is explained in detail below.

There are three modes of operation.

In the first operating mode all segments are set to the same temperature, i.e. the same temperature cycles are run on all segments. This operating mode corresponds to the operation of a conventional thermocycling device.

In the second operating mode the segments are actuated with different temperatures, wherein the temperatures are so controlled that the temperature difference $\Delta T$ of adjacent segments 8 is less than a predetermined value K which amounts for example to 5°-15° C. The value to be chosen for K depends on the quality of the thermal decoupling. The better the thermal decoupling, the greater the value which can be chosen for K.

The temperature cycles input by the user may be distributed automatically by the central control unit 16 to the segments 8, so that the temperature differences between adjacent segments are kept as small as possible.

This second operating mode may be provided with a function by which the user inputs only a single temperature cycle or PCR cycle, and the central control unit 16 then varies this cycle automatically. The parameters to be varied, such as temperature, residence time or rate of temperature change, may be chosen by the user separately or in combination. Variation of the parameters is effected either by linear or sigmoidal distribution.

In the third operating mode, only part of the segments is actuated. In plan view (FIG. 3, FIG. 4, FIGS. 6 to 9) the segments 8 have side edges 20. In this operating mode, the segments 8 adjacent to the side edges of an actuated segment 8 are not actuated. If the segments 8 themselves form a regular pattern (FIG. 3, FIG. 4, FIG. 6, FIG. 7 and FIG. 8), then the actuated segments are distributed in a chessboard pattern. In the embodiments shown in FIGS. 1 to 4, three of the six segments 8 can be actuated, namely the two outer segments of one row and the middle segment of the other row.

In this operating mode the actuated segments are not influenced by the other segments, and their temperature may be set completely independently of the other actuated segments. By this means it is possible to run quite different temperature cycles on the individual segments, with one of the segments for example heated up to the denaturing temperature and another held at the annealing temperature. Thus it is possible for the residence times, i.e. the intervals of time for which the denaturing temperature, the annealing temperature and the elongation temperature are held, also the rates of temperature change, to be set as desired, and run simultaneously on the individual segments. In this way it is possible to optimise not only the temperatures, but also the residence times and the rates of temperature change.

In this operating mode it may be expedient to heat the non-actuated segments 8 a little, so that their temperature lies roughly in the range of the lowest temperature of the adjacent actuated segments. This avoids the non-actuated segments forming a heat sink for the actuated segments and affecting their temperature profile adversely.

A second embodiment of the device according to the invention is shown in FIGS. 2 and 3. the basic design corresponds to that of FIG. 1, so that identical parts have been given the same reference number.

The second embodiment differs from the first embodiment by virtue of the fact that the side edges 20 of the segments 8 adjacent to the side walls 4 of the housing 2 engage in a slot 21 running round the inner face of the side walls 4, and are fixed therein for example by bonding. By this means the individual segment elements 10 are fixed in space, thereby ensuring that despite the form of the gaps between the segment elements 10, all reaction vessel holders 12 are arranged in the pattern of the reaction vessels of a microtiter plate. The side walls 4 of the housing 2 are made of a non heat conducting material. This embodiment may also be modified such that the slot 21 is introduced in a frame formed separately from the housing 2. The frame and the segments inserted in it form a part which may be handled separately during production and is bonded to the heating and cooling devices.

Figure 5:
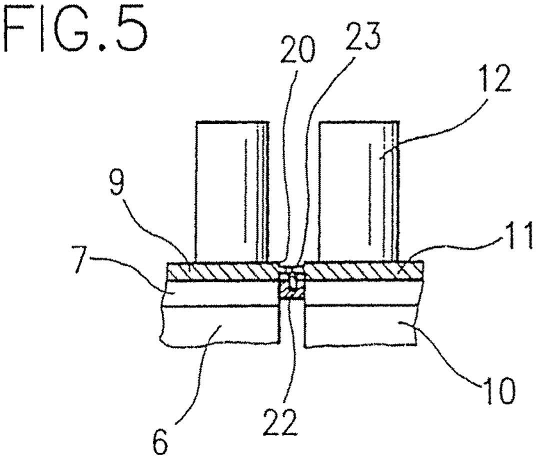

A third embodiment is shown schematically in FIGS. 4 and 5. In this embodiment, ties 22 of non heat conducting material are located somewhat below the base plates 11 of the segments 8 in the areas between the segment elements 10 and between the segment elements 10 and the side walls 4 of the housing 2. On the side edges 20 of the segments 8 and of the base plates 11 respectively are formed hook elements 23 which are bent downwards. These hook elements 23 engage in corresponding recesses of the ties 22 (FIG. 5), thereby fixing the segments 8 in their position. The hook elements 23 of adjacent segments 8 are offset relative to one another. The ties 22 thus form a grid, into each of the openings of which a segment 8 may be inserted.

This type of position fixing is very advantageous since the boundary areas between the segments 8 and the ties 22 are very small, so that heat transfer via the ties 22 is correspondingly low. Moreover this arrangement is easy to realise even in the confined space conditions between adjacent segment elements.

Shown in schematic plan view in FIGS. 6 to 9 are reaction vessel receiving elements 9 which represent further modifications of the device according to the invention. In these reaction vessel receiving elements 9, the individual segments 8 are joined by webs 24 of a thermally insulating material joined to form a single unit The ties 22 are arranged between the side edges 20 of the base plates 11, to which they are fixed for example by bonding.

Figure 6:
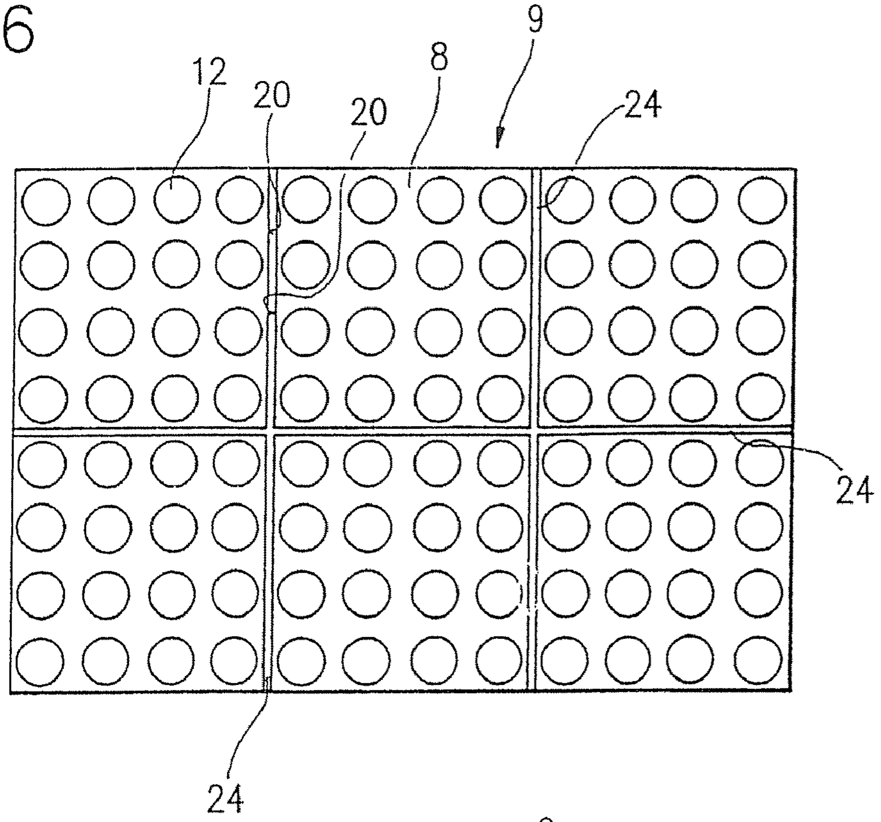

The segmentation of the reaction vessel receiving element of FIG. 6 corresponds to that of the first and second embodiment (FIG. 1-3), in which 4×4 reaction vessel holders are arranged on each segment 8.

Figure 7:
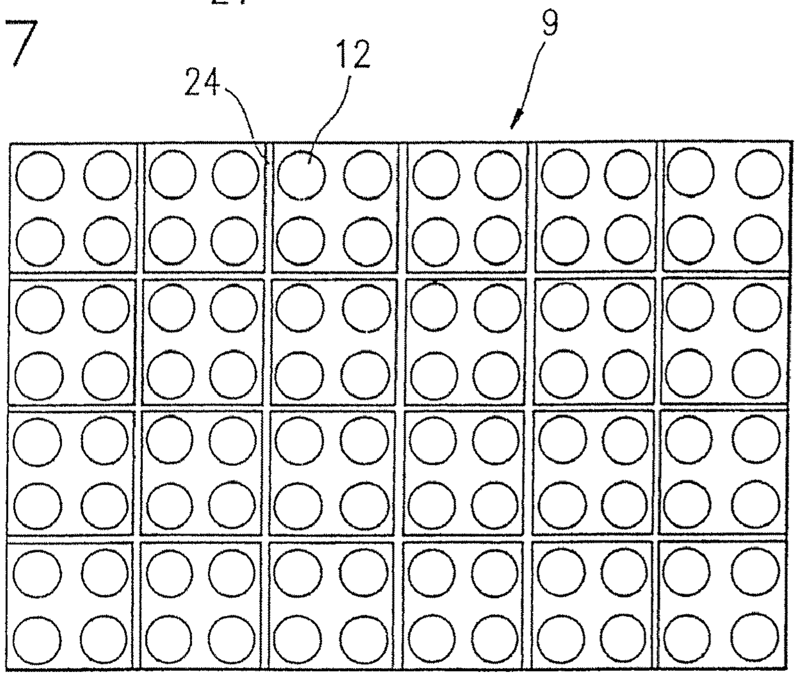

The reaction vessel receiving element 9 shown in FIG. 7 is comprised of 24 segments 8 each with 4×4 reaction vessel holders 12, while the segments 8 are in turn connected by means of thermally insulating webs 24.

In the reaction vessel receiving element 9 shown in FIG. 8, each segment 8 has only a single reaction vessel holder 12.

For the relatively finely sub-divided reaction vessel receiving elements 9 it is expedient to integrate temperature sensors in the thermocycling device. These temperature sensors sense the temperatures of the individual segments, so that the temperature of the segments 8 is regulated in a closed control loop on the basis of the temperature values determined by the temperature sensors.

Infrared sensors may for example be used as temperature sensors, located e.g. in the cover. With this sensor arrangement it is possible to sense the temperature of the reaction mixture directly.

FIG. 9 shows a reaction vessel receiving element 9 with six segments 8, rectangular in plan view, and a segment 8*a* in the form of a double cross formed by three intersecting rows of reaction vessel holders 12. The six rectangular segments 8 are each separated from the next rectangular segment by a row or column of reaction vessel holders. This segmentation is especially advantageous for the third operating mode described above, since the rectangular segments 8 are not in contact with one another and may therefore be actuated simultaneously as desired, with only the segment 8*a* in the form of a double cross not being actuated.

The segments 8 of the reaction vessel receiving element 9 are made from a metal with good heat conducting properties, e.g. aluminium. The materials described above as non-heat conducting materials or thermally insulating materials are either plastics or ceramics.

A further embodiment of the device according to the invention is shown in FIG. 11. In this embodiment the individual segments 8*b* of the reaction vessel receiving element 9 are fixed in position by means of a clamping frame 25 (FIG. 10).

The clamping frame 25 is grid-shaped and formed by longitudinal ties 26 and cross ties, wherein the ties 26, 27 span openings. Through these openings extend the reaction vessel holders 12 of the segments 8*b*. In the present embodiment, the ties 26, 27 are for instance in positive contact with the reaction vessel holders 12 and with the base plate 11 which protrudes from the reaction vessel holders. The 25 is provided with holes 28, through which pass bolts 29 for fixing the clamping frame to a thermocycling device 1.

Located below each of the segments 8*b* is a separately actuable Peltier element 7 and a cooling element 30 which extends over the area of all the segments 8*b*. Located in each case between the cooling element 30 and the Peltier element 7, and between the Peltier element 7 and the respective segment 8*b* is a heat conducting foil 31. The cooling element 30 is provided with holes through which extend the bolts 29, each fixed by a nut 32 to the side of the cooling element 30 facing away from the reaction vessel receiving element 9.

The clamping frame 25 is made from a non heat conducting material, in particular POM or polycarbonate. It therefore allows a fixing of the segments 8*b* of the reaction vessel receiving element 9 wherein the individual elements between the segments 8*b* and the cooling element 30 are under tension, thereby ensuring good heat transfer in the vertical direction between the individual elements. Since the clamping frame itself has poor heat conducting properties, the heat transfer between two adjacent segments 8*b* is kept low. For further reduction of heat transfer between two adjacent segments, the surfaces of the clamping frame 25 in contact with the segments 8*b* may be provided with narrow webs, so that in the areas adjoining the webs, air gaps are formed between the clamping frame 25 and the segments 8*b*.

In the embodiment shown in FIG. 11, a so-called heat pipe 33 is fitted between every two rows of reaction vessel holders 12. Such a heat pipe is distributed for example by the company THERMACORE INTERNATIONAL, Inc., USA. It is comprised of a gastight jacket, in which there is only a small amount of fluid. The pressure in the heat pipe is so low that the fluid is in a state of equilibrium between the liquid and the gaseous aggregate state, and consequently evaporates at a warmer section of the heat pipe and condenses at a cooler section. By this means, the temperature between the individual sections is equalised. The fluid used is, for example, water or freon.

Through integration of such a heat pipe in the segments 8*b* of the reaction vessel receiving element 9, a temperature equalisation is effected over the segment 8*b*. By this means it is ensured that the same temperature is present over the whole segment 8*b*.

A further embodiment of the thermocycling device 1 according to the invention is shown in FIG. 12. The design of this thermocycling device 1 is similar to that of FIG. 11, therefore similar parts have been given the same reference numbers.

The segments 8*c* of this thermocycling device 1, however, have no heat pipe. Instead of heat pipes, a temperature equalisation plate 34 is provided in the area beneath each of the segments 8*c*. These temperature equalisation plates 34 are flat elements with a surface corresponding to the basic surface of one of the segments 8*c*. These temperature equalisation plates 34 are hollow bodies with a small amount of fluid, and work on the same principle as the heat pipes. By this means it is once again ensured that there are no temperature variations within a segment 8*c*.

The temperature equalisation plate may however be made from materials with very good heat conducting properties, such as e.g. copper. Additional heating and/or cooling elements, e.g. heating foils, heating coils or Peltier elements, may be integrated in such a temperature equalisation plate. The heating and cooling elements support homogeneity and permit more rapid heating and/or cooling rates. A Peltier element, which generally does not have an even temperature distribution, is preferably combined with a flat heating element.

The invention is described above with the aid of embodiments with 96 recesses for receiving a microtiter plate with 96 reaction vessels. The invention is not however limited to this number of recesses. Thus for example the reaction vessel receiving element may also have 384 recesses to receive a corresponding microtiter plate. With regard to features of the invention not explained in detail above, express reference is made to the claims and the drawing.

In the embodiments described above, a cooling device with a fluid cooling medium is used. Within the scope of the invention it is also possible to use a gaseous cooling medium, in particular air cooling, instead of a fluid cooling medium.

The reaction vessel receiving elements described above are comprised of a base plate with roughly tubular reaction vessel holders. Within the scope of the invention it is also possible to use a metal block, in which recesses to receive the reaction vessels of the microtiter plate are made.

LIST OF REFERENCES

1 thermocycling device
2 housing
3 bottom
4 side wall
5 intermediate wall
5*a* base
6 heat exchanger
7 Peltier element
8 segment
8*a* segment in the form of a double cross
9 reaction vessel receiving element
10 segment element
11 base plate
12 reaction vessel holder
13 first control unit
14 cooling circuit
15 second control unit
16 central control unit
17 cover
18 heating element
19 control valve
20 side edge
21 slot
22 ties
23 hook element
24 web
25 clamping frame
26 longitudinal tie
27 cross tie
28 hole
29 bolt
30 cooling element
31 heat conducting foil
32 nut
33 heat pipe
34 temperature equalisation plate

The invention claimed is:

1. A method for thermal cycling of biological or chemical samples comprising:

disposing a plurality of sample volumes in a block comprising a plurality of block segments thermally decoupled from one another;

disposing a thermoelectric device comprising a plurality of respective thermoelectric elements in operative association with respective block segments of the plurality of block segments;

inputting at least one temperature cycle into a control unit for the plurality of block segments;

measuring the actual temperature of each block segment during the at least one temperature cycle;

independently modulating the temperature of each respective block segment via the respective thermoelectric element of the thermoelectric device and a heated cover in thermal communication with the block, wherein the temperature is modulated by comparing the measured actual temperature to the at least one temperature cycle input into the control unit; and equalizing the temperature of the plurality of block segments to a substantially uniform temperature via a plurality of respective thermal plates operatively associated with the plurality of block segments.

2. The method of claim 1, further comprising heating the plurality of block segments via a plurality of respective heating elements operatively associated with the plurality of block segments.

3. The method of claim 1, wherein equalizing the temperature via the plurality of thermal plates comprises equalizing the temperature via a plurality of thermal plates comprising copper.

4. The method of claim 1, further comprising cooling the plurality of block segments via a plurality of respective cooling elements in thermal communication with the plurality of thermoelectric device elements.

5. The method of claim 1, further comprising circulating a cooling medium through the plurality of thermal plates.

6. The method of claim 1, wherein disposing a plurality of sample volumes in the block comprises disposing a microtiter plate in the block.

7. The method of claim 1, wherein an air gap is provided between the block segments of the plurality of block segments.

8. The method of claim 1, wherein the plurality of block segments comprises separate respective cooling circuits.

* * * * *